April 12, 1932. E. ANDERSON 1,853,393
ART OF SEPARATION OF SUSPENDED MATERIAL FROM GASES
Filed April 9, 1926
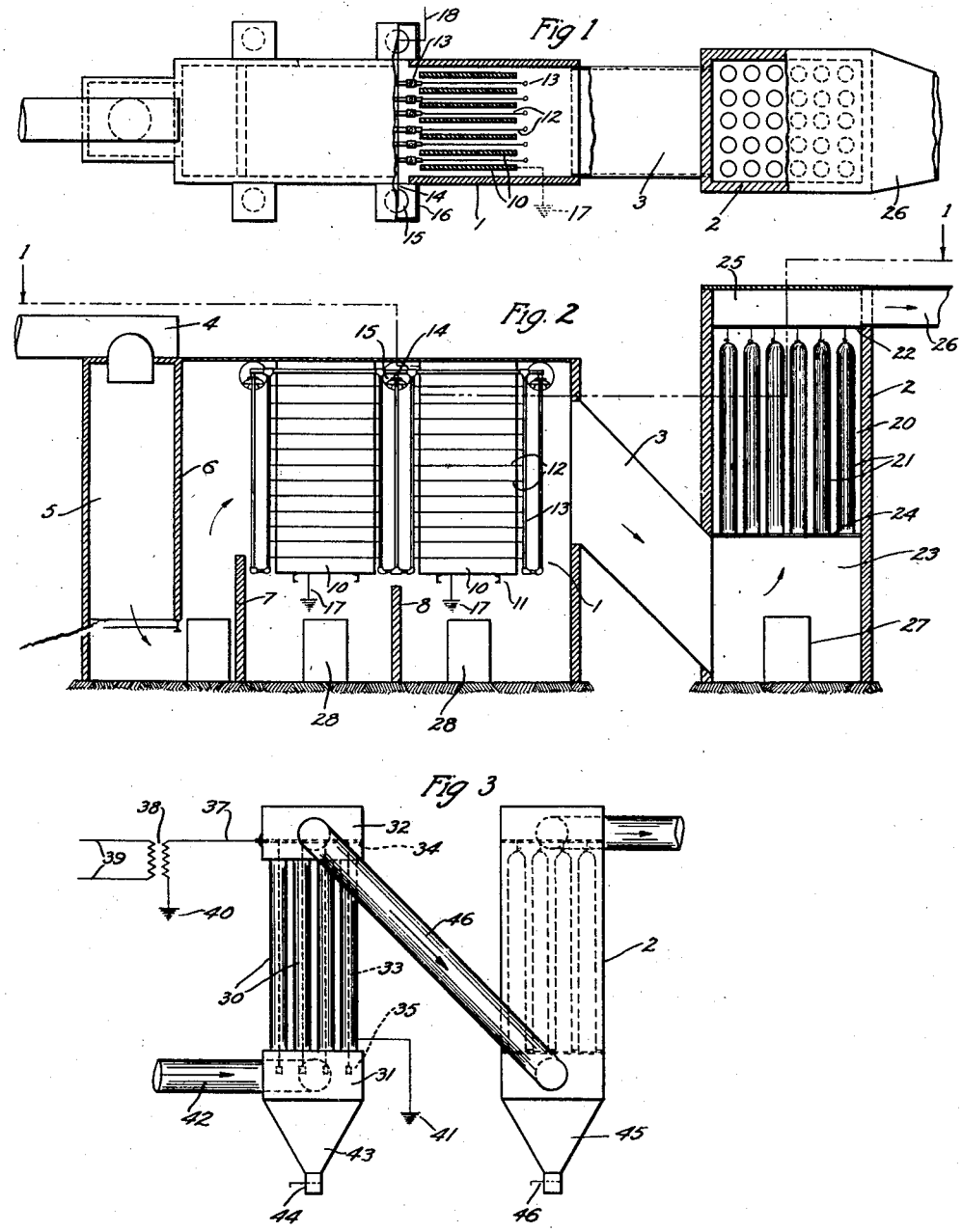
INVENTOR
Evald Anderson
BY Arthur P. Knight
ATTORNEY Patented Apr. 12, 1932

1,853,393

UNITED STATES PATENT OFFICE

EVALD ANDERSON, OF ALHAMBRA, CALIFORNIA, ASSIGNOR TO INTERNATIONAL PRECIPITATION COMPANY, OF LOS ANGELES, CALIFORNIA, A CORPORATION OF CALIFORNIA

ART OF SEPARATION OF SUSPENDED MATERIAL FROM GASES

Application filed April 9, 1926. Serial No. 100,960.

Certain features of the invention claimed herein are disclosed in my application Serial No. 753,113, filed December 1, 1924.

This invention relates to the separation of suspended solid material from gases, and is particularly adapted for the separation and removal from gases of light fume or finely divided solid matter such as fume produced in cement burning, or in metallurgical operations, or lamp black, carbon black, etc., which material by reason of its fine division and its light fluffy nature is difficult to collect in ordinary electrical precipitation apparatus or by other well-known separating means such as settling chambers, cyclone separators, bag filters, etc. While as stated it is difficult to collect such material in an ordinary electrical precipitating apparatus I have found that the particles of material may be agglomerated by the action of an electrical field, either alternating or unidirectional, to such an extent that they may then be readily collected in an ordinary bag filter. The process of my present invention consists essentially in subjecting the gases carrying the light finely divided solid suspended material to the action of an electrical field between opposing electrodes, one of which may be adapted to serve as a discharge electrode and the other as a receiving electrode, whereby such material is caused to agglomerate, and then passing the gas stream, while still carrying a considerable portion and in many cases the major portion of the agglomerated particles suspended therein, into a filtering apparatus such as an ordinary bag filter in such manner that the agglomerated material is retained on the filtering medium of such filtering apparatus while the clean gas passes therethrough. My invention may be carried out in connection with any form of electrical apparatus provided with means for maintaining a high potential electrical field and adapted for the passage of a gas stream containing solid material through such field. An example of apparatus suitable for carrying out my invention is shown in the accompanying drawings and referring thereto:

Fig. 1 is a partly sectional plan view of the separating apparatus taken on line 1—1 in Fig. 2.

Fig. 2 is a vertical section thereof.

Fig. 3 is a side elevation of a modified form of apparatus.

The apparatus shown in Figs. 1 and 2 comprises an electrical agglomerating or ionizing chamber or apparatus 1 and a filtering apparatus 2 beyond or following said agglomerating chamber and connected therewith for example by flue 3 in such manner that a stream of the gas to be treated and containing suspended solid particles passes first through the agglomerating chamber and the entire gaseous constituent thereof then passes through the filtering apparatus. Inlet or supply flue 4 conducts the gas to be treated to a flue 5 opening into the lower part of the agglomerating chamber 1 and baffles 6, 7, and 8 may be provided for directing the gas through the region of the electrical field in the agglomerating chamber.

The electrical apparatus is shown as comprising two units or sections each having a plurality of receiving electrodes 10 mounted within the chamber 1 so as to extend parallel to the direction of gas flow therethrough, said electrodes being for example mounted at their lower ends on supporting beams 11 and being suitably secured at their upper ends to the top of chamber 1. Between the receiving electrodes 10 are mounted the discharge electrodes 12 consisting for example of rods, bars, or wires mounted on suitable frames 13 which are carried by high tension supports 14 mounted on suitable insulators 15 in insulator box 16. Suitable means are provided for maintaining a high potential electrical field between the discharge electrodes 12 and the receiving electrodes 10, the receiving electrodes 10 being generally grounded as indicated at 17 and the discharge system being connected for example by wire 18 to a suitable energizing circuit for supplying either alternating or unidirectional (preferably rectified alternating) high tension current thereto, the circuit being completed through a ground connection in the usual manner of such apparatus.

The filtering apparatus 2 comprises a chamber 20 within which are mounted a plurality of filter bags or tubes 21 of suitable pervious cloth, said bags being closed at their upper ends and provided with supporting means 22 and being open at their lower ends into inlet header 23, a suitable partition or plate 24 being provided for closing off from said inlet chamber the space between the filter bags so that the gas is caused to pass from said inlet chamber into the interior of and through the filter bags. The space around the filter bags is open at its upper end into outlet chamber 25 which may be connected to outlet flue 26 for conducting away the clean gas.

The filter bags may be shaken from time to time in any suitable manner for example by hand, or if desired suitable mechanical means not shown may be provided for this purpose. Suitable means such as cleaning door 27 may be provided at the bottom of the filtering apparatus for removal of collected material and suitable means such as cleaning doors 28 may also be provided at the lower portion of the agglomerating chamber 1 for removing any solid material collected therein.

In carrying out the separating operation in the above described apparatus the agglomerating action may for example be caused by means of a unidirectional high potential field in which case wire 18 may lead to one of the output terminals of a suitable rectifier for example a mechanical rectifier whose other output terminal is grounded so as to complete the electric circuit. The gas to be treated and containing finely divided solid suspended matter is passed through the apparatus in any suitable manner for example by natural or induced draft. The high potential electric field causes agglomeration of the finely divided particles to form particles of much larger sizes than those originally present. In case unidirectional current is used there will also in general be some precipitation of the particles on the receiving electrodes 10 and such precipitated material may fall to the bottom of the precipitating chamber 1 or it may be subsequently brushed off and carried away by the gas stream, it being understood that by suitably regulating the velocity of the gas stream the proportion of solid material which is collected at the bottom of the precipitating chamber and the proportion which is carried away by the gas stream and subsequently collected in the filtering apparatus may be controlled as desired.

In order to provide for maximum gas-treating capacity in a given size installation, however, I prefer in general to pass the gas at such a velocity, when using unidirectional current, that a considerable portion of the precipitated material will be brushed off the receiving electrodes by the gas stream and carried along therewith. In any event however the gas passing through the flue 3 from the electrical agglomerating chamber to the filtering apparatus will contain a large amount of the original suspended matter but such suspended matter is in the form of larger particles than when it enters the electrical apparatus. Such larger particles may be the result of mere agglomeration by the action of the electrical field without actual precipitation on the electrodes, or they may be wholly or in part due to the agglomerating effect of electrical precipitation on the receiving electrodes and subsequent dislodgment therefrom. The gas stream passes then through the filtering apparatus and the relatively large particles of solid material are caught by the filter bags while the clean gases pass out through outlet flue 26.

It should be observed that if it were not for the agglomerating action which occurs in the electrical apparatus the suspended material would be of such a finely divided nature that it would be difficult to catch by means of filter bags as it would be necessary to make such bags of such fine mesh or porosity as to seriously restrict the gas flow therethrough and cause an objectionably high back pressure. By first agglomerating the solid particles however by means of a high potential electrical field I am enabled to catch the agglomerated particles in a bag filter of sufficiently open mesh to permit easy flow of the gas therethrough. Furthermore, the increased size of the agglomerated particles causes the layer of solids deposited on the filter medium to be of such relatively coarse character as to offer materially less resistance to gas flow therethrough than would be the case with the original finely divided particles. The solid material collected in the bag filter may be dislodged from time to time by shaking the filter bags in any suitable manner whereupon the collected material falls to the bottom of inlet chamber 23 whence it may be removed by means of cleaning doors 27.

Other forms of electrical apparatus may also be used in connection with my invention for example as shown in Fig. 3 such apparatus may comprise a plurality of vertical pipes or tubes 30 adapted to act as receiving electrodes and extending between lower and upper header 31 and 32, and a plurality of vertical discharge electrodes, such as wires or rods 33 one of which is suspended centrally within each tube or pipe. Said discharge wires may be supported at their upper ends as at 34 and may be provided at their lower ends with suitable tensioning means such as weights 35 for causing them to hang in a vertical position. The discharge wires may be connected by wire 37 to the secondary winding of step-up transformer 38 whose primary winding is connected by wires 39 to a commercial source of alternating current of relatively low voltage. The other side of the transformer secondary winding is grounded as indicated at 40 and the receiving electrodes 30 are grounded as indicated at 41 so as to complete the electrical circuit. Gas inlet flue 42 may be connected to lower header 31 and suitable hopper 43 and discharge means 44 may be provided below such header.

From upper header 32 of the electrical apparatus flue 46 leads to the lower header of the bag filtering apparatus 2 which may be essentially the same as that above described but is shown as provided at its lower end with hopper 45 and discharge means 46.

In the operation of this form of the invention an alternating electrical field of suitable voltage is maintained between the discharge and receiving electrodes whereby the solid particles become ionized and hence agglomerated.

When using alternating current there is in general little if any actual precipitation of the solid material onto the receiving electrodes but the alternating field is quite effective in causing agglomeration to occur. Some of such agglomerated particles may fall into hopper 43 whence they may be removed as desired by discharge means 44. The majority of the agglomerated particles however are carried by the gas stream over into the filtering apparatus where they are collected as before and removed from time to time or continually through discharge means 46.

By means of my invention I am enabled to handle a much greater volume of gas and quantity of solid material in an apparatus of a given size and cost than would be possible if it were attempted to remove the suspended material by means of an electrical precipitator acting alone or by means of a bag filter alone. Furthermore I am enabled by the above-described means to remove from gases certain materials which it would be practically impossible to remove on a commercial scale by means of either an electrical precipitation apparatus or a filtering apparatus or any other known separating apparatus acting alone. In case an electrical precipitator alone were used it would be necessary to pass the gas at very low velocity in order to collect the light finely divided material therein and prevent it from being carried away by the gas stream, and a very large size apparatus would therefore be required to handle any considerable volume of gas. If a bag filter alone were to be used it would require the use of cloth of such fine mesh that the gas could be passed therethrough only at a relatively low velocity and as before a prohibitively large apparatus would be required. By means of my invention on the other hand wherein the electrical field is utilized primarily to agglomerate rather than to actually separate the solid material, a high velocity through the electrical apparatus may be maintained and by reason of the larger size of the agglomerated particles a relatively coarse filtering medium may be used in the filtering apparatus thus permitting a high velocity at this stage also. Both the electrical apparatus and the filtering apparatus are therefore capable of handling a large volume of gas in proportion to their size so that the utmost efficiency is realized on the basis of floor space required and cost of installation and operation.

Any suitable form of filtering apparatus may be employed which has a filter medium whose interstices are sufficiently fine to mechanically intercept the agglomerated suspended material and thus separate it from the gas stream, although it will be understood that the greatest capacity may be obtained by using a filter medium of a mesh just fine enough to effectively intercept or hold back such agglomerated suspended material. The term "filtering" as used herein is understood to mean passage of the gas through a filter medium adapted to mechanically intercept or hold back the suspended material contained in the gas leaving the agglomerating chamber.

I claim:

1. The method of removing suspended material from gases which comprises passing a stream of gas containing finely divided solid particles in suspension therein through an alternating high potential electric field to cause agglomeration of the finely divided solid particles to form larger particles; maintaining the velocity of gas flow within the region of such field sufficiently high to cause the major portion of the suspended solid material originally contained in the gas to be carried in agglomerated condition out of said field by the gas; and then subjecting the gas stream after leaving the region of said electric field to a filtering operation to mechanically intercept such agglomerated solid material and thus remove the same from the gas stream, such filtering operation comprising passing the gas through a filter medium having interstices sufficiently fine to mechanically intercept the agglomerated solid material and cause the same to build up thereon, and the increased size of the agglomerated particles causing the layer of solids thus deposited on said filter medium to be of such relatively coarse character as to offer materially less resistance to gas flow therethrough, than would be the case with the original finely divided particles.

2. The method of removing suspended material from gases which comprises subjecting a body of gas containing finely divided solid particles to the action of a high potential electric field to cause agglomeration of such particles to form larger particles; maintaining the velocity of gas flow within such field sufficiently high to cause the major portion of the suspended solid material originally contained in the gas to be carried in agglomerated condition out of said field by the gas; and then subjecting such body of gas to a filtering operation outside the electric field to mechanically remove such agglomerated solid material therefrom, such filtering operation comprising passing the gas through a filter medium having interstices sufficiently fine to mechanically intercept the agglomerated solid material and cause the same to build up thereon, and the increased size of the agglomerated particles causing the layer of solids thus deposited on said filter medium to be of such relatively coarse character as to offer materially less resistance to gas flow therethrough than would be the case with the original finely divided particles.

In testimony whereof I have hereunto subscribed my name this 24th day of March, 1926.

EVALD ANDERSON.